(No Model.) 3 Sheets—Sheet 1.

J. W. DOYLE.
COMBINED CHECK ROWER, GRAIN PLANTER, AND CULTIVATOR.

No. 374,460. Patented Dec. 6, 1887.

WITNESSES.
John F. Nelson
Emma Arthur

INVENTOR.
James W. Doyle,
By Knight Bros.
Attorneys.

(No Model.) 3 Sheets—Sheet 2.

J. W. DOYLE.
COMBINED CHECK ROWER, GRAIN PLANTER, AND CULTIVATOR.

No. 374,460. Patented Dec. 6, 1887.

WITNESSES.
John F. Nelson
Emma Arthur

INVENTOR.
James W. Doyle
By Knight Bros.
Attorneys

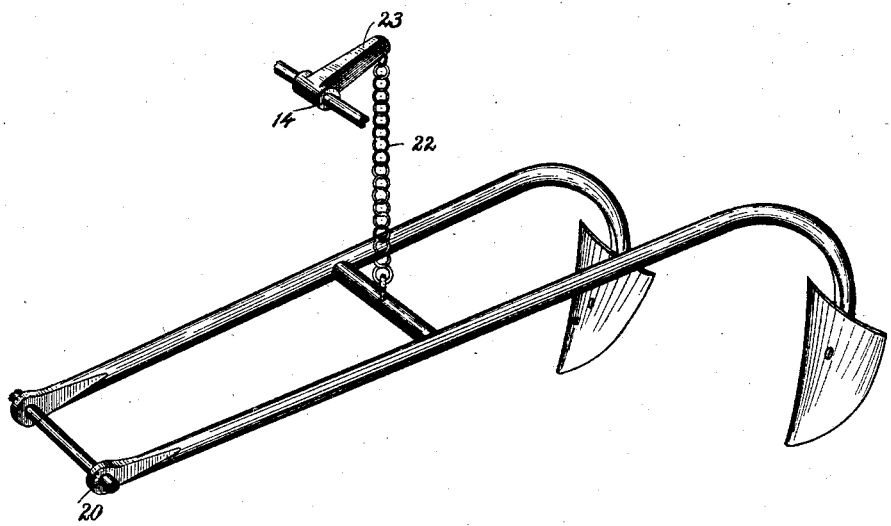

UNITED STATES PATENT OFFICE.

JAMES W. DOYLE, OF SHELDON, MISSOURI, ASSIGNOR OF ONE-HALF TO JERRY WILLHITE, OF SAME PLACE.

COMBINED CHECK-ROWER, GRAIN-PLANTER, AND CULTIVATOR.

SPECIFICATION forming part of Letters Patent No. 374,460, dated December 6, 1887.

Application filed July 14, 1887. Serial No. 244,314. (No model.)

*To all whom it may concern:*

Be it known that I, JAMES W. DOYLE, a citizen of the United States, residing in Sheldon, county of Vernon, and State of Missouri, have invented a certain new and useful Combined Check-Rower, Grain-Planter, and Cultivator, of which the following is a full, clear, and exact specification.

The object of my invention is to construct an implement which will automatically form the drill, drop the grain therein, mark the hill at which the grain is dropped, and cover the grain over; and my invention principally consists in providing the ground-wheels of a grain-planter with markers of peculiar construction that will make an indentation or mark on the ground as the wheels go around, and in so proportioning and timing the dropping mechanism as to drop a hill of grain whenever one of the markers on the ground-wheels is on the ground.

I will now describe my invention with reference to the accompanying drawings, and then point it out more specifically in the claims.

Figure 1:
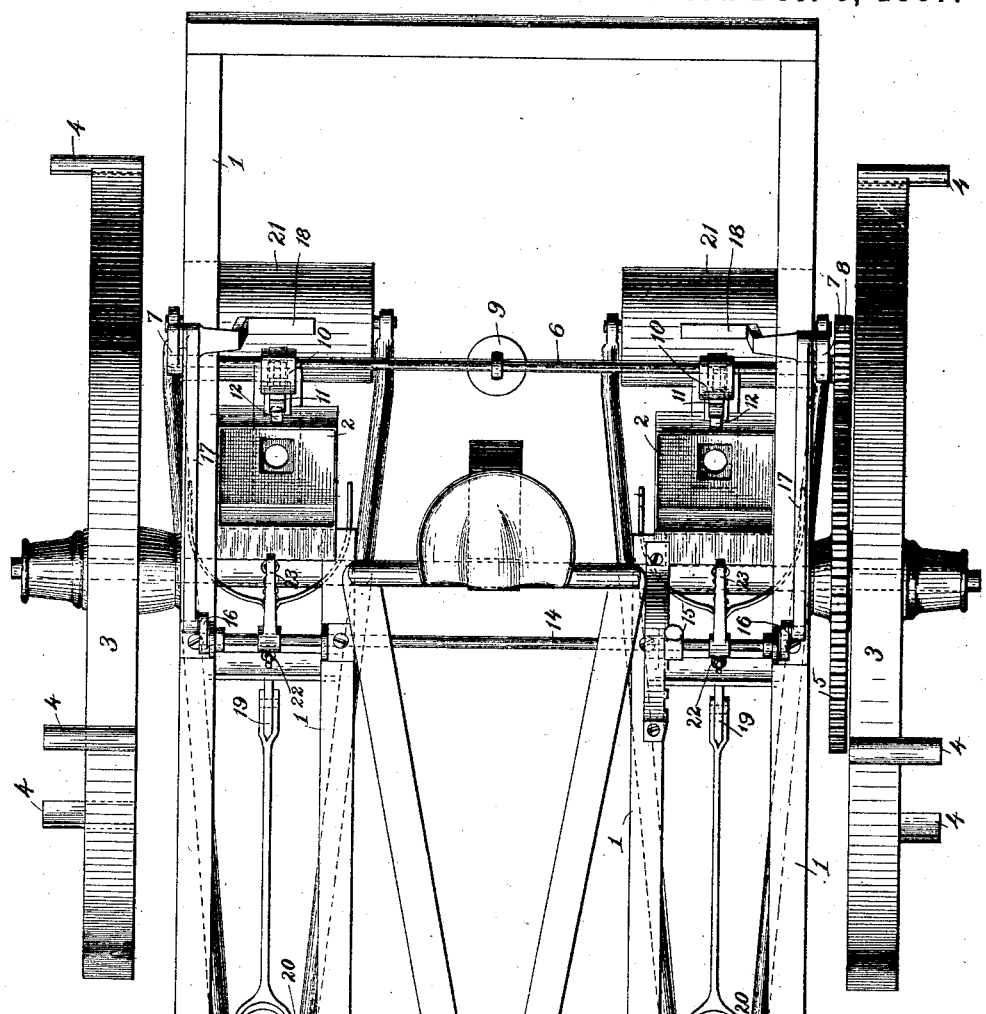
Figure 2:
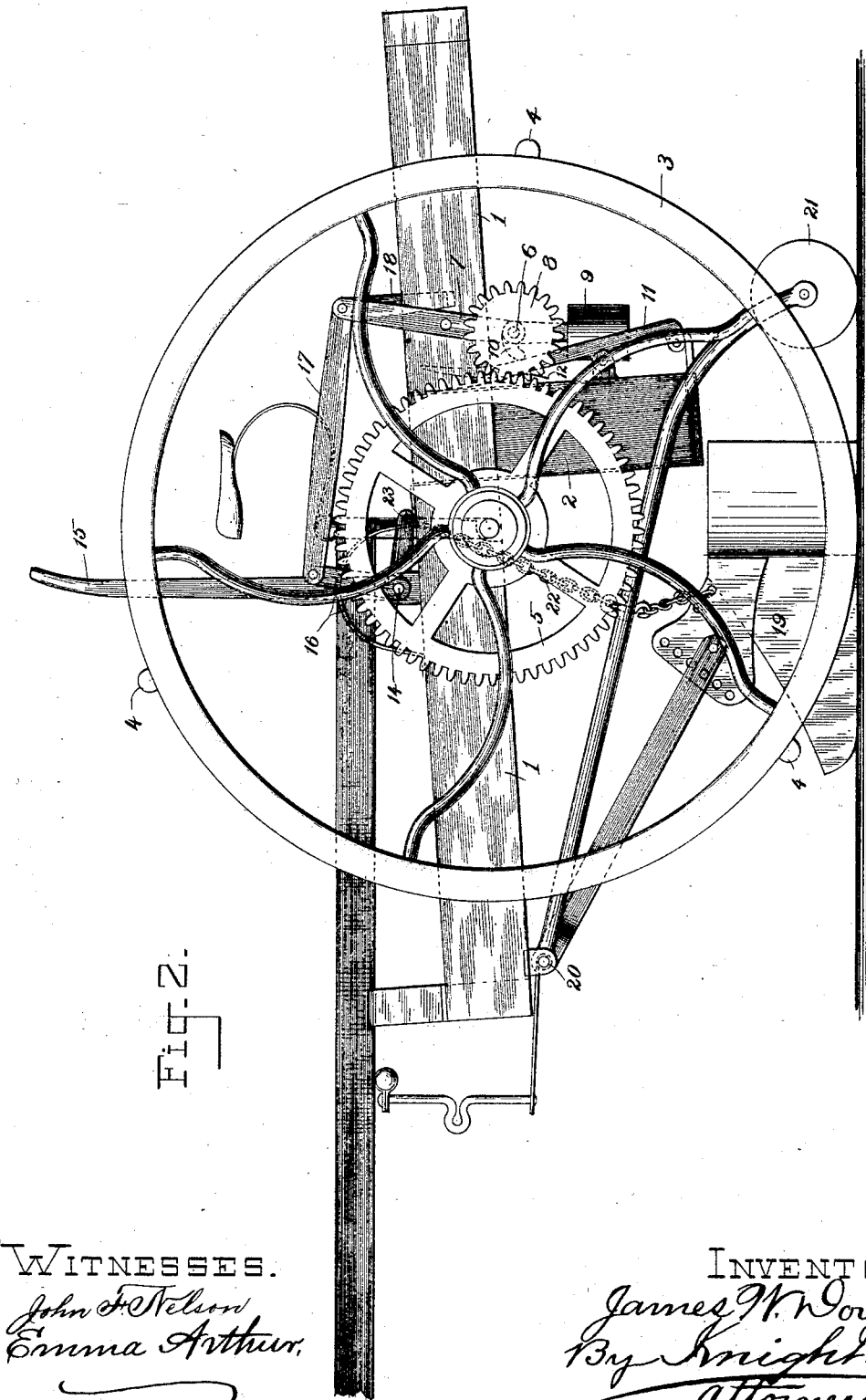

In said drawings, Figure 1 is a plan of the device designed to drop two rows of grain at once. Fig. 2 is a side elevation of the same. Fig. 3 is a form of cultivator shovels to be used with my device.

1 represents the frame-work of the device, to which the grain-boxes 2 are detachably secured.

3 are the ground-wheels, which have the "markers" 4 secured on their peripheries by any suitable means.

5 is a gear-wheel made to revolve in unison with the ground-wheel.

6 is a shaft extending from side to side of the frame, and journaled in swinging levers 7, and having at one end a pinion, 8, which may be caused to engage with the large gear-wheel by means of the swinging levers 7. This shaft carries a cam, 10, and a counter-balance, 9, which holds the cam, when the device is out of gear, in a position ready to engage at once with the lever 11, which operates the valve or the dropper in the bottom of the grain-receptacle by motion imparted to it in one direction by the said cam and in the opposite direction by a spring, 12; hence at every revolution of the pinion the cam disengages the lever 11 and the spring forces the valve inward and drops the grain in the customary manner.

The distance between the markers on the ground-wheels determines the distance between the hills of grain, and the other mechanism should be so proportioned as to agree with the spaces made by said markers. Therefore, if I place three markers on the ground-wheel, dividing its periphery into three equal parts, I necessarily make the pinion 8 of such size that its circumference will be equal to one-third the circumference of the gear-wheel 5, in order that by turning the ground-wheels the distance of the space between the markers the pinion will be revolved once and drop a hill of grain where the marker touched the ground.

14 is a rock-shaft extending transversely of the machine, and having an operating-lever, 15, which may be locked in position by a segment-rack, as usual. At each end of this shaft is a crank-arm, 16, to which and to the swinging levers 7 is connected a link, 17, whereby the latter levers are operated. Secured to these links 17 is a downwardly-projecting arm, 18, which, when the machine is thrown out of gear, comes in contact with the upper end of the lever 11, depressing it, closing the outlet of the dropper, and allowing a charge of grain to enter the dropper in readiness to be dropped as soon as the machine is thrown into gear again.

19 is a plow, of any suitable construction, in front of the dropper, for forming the drill which has its beam hinged at 20 to the frame 1, and 21 is the roller following the dropper for covering the hill. This roller also has its shafts hinged at 20. When the dropper is thrown out of gear, this drill and roller are also held aloof from the ground by reason of chains 22 being connected with the drill and with the shafts of the roller and secured at their upper extremities to crank-arms 23 on the rock-shaft 14.

The device is operated in the field as follows: The dropping mechanism being out of gear, the operator waits until one of the markers on the ground-wheel is on the ground.

Then he immediately throws the mechanism into gear and starts the row. When the end of the row is reached, he throws the mechanism out of gear and wheels the machine into position to return, waiting this time until one of the markers is even with the last hill dropped, when he immediately throws the gearing together and drops a row, as before, using the wheel-tracks made in dropping the previous row as a guide.

When it is desired, the grain-boxes may be readily detached; so, also, may the drills and the rollers, and an ordinary pair of cultivator-shovels, arranged as shown in Fig. 3, may be attached at each side in their stead, the latter being also hinged at 20 and attached by chains to the crank-arms 23, whereby the shovels may in like manner be held aloof when not in use.

Having thus described my invention, the following is what I claim as new therein and desire to secure by Letters Patent:

1. The combination, with the gear-wheel 5, the grain-box having a suitable valve, a lever for operating said valve, and a spring for holding said valve normally closed with the box, of a shaft, a pinion on said shaft adapted to engage the wheel 5, pivoted levers in which said shaft is journaled, suitable means for oscillating said levers, and an arm, 18, connected with one of said pivoted levers, for engaging with the valve-lever, whereby communication between the box and valve is opened when the gear-wheels are disengaged, substantially as and for the purposes set forth.

2. The combination, with the grain-box having a valve, a lever for operating said valve, a spring for holding said valve at one extremity of its movement, and the ground-wheels, of blocks or pieces 4 on the tires of said wheels, swinging levers 7, an arm, 18, connected with one of said levers 7 and adapted to depress the valve-lever, a shaft journaled in said levers 7, a pinion on said shaft, a gear-wheel keyed to the hub of the ground-wheel, of a diameter equal to the diameter of said pinion multiplied by the number of blocks (four) on either of the ground-wheels, a cam on said shaft for engaging with the valve-lever at every revolution of the shaft, a counter-balance for holding said cam normally in engagement with said lever, and suitable mechanism for operating the levers 7, whereby the pinion is caused to engage and disengage with the gear-wheel and the arm 18 with the valve-lever.

JAMES W. DOYLE.

Witnesses:
W. R. LIPSCOMB,
C. LIPSCOMB.